United States Patent [19]

Pivonka

[11] Patent Number: 4,984,515
[45] Date of Patent: Jan. 15, 1991

[54] PORTABLE BARBEQUE GRILL CART

[76] Inventor: Ralph M. Pivonka, 915 Maple, La Crosse, Kans. 67548

[21] Appl. No.: 292,881

[22] Filed: Jan. 3, 1989

[51] Int. Cl.⁵ .................................. A47J 36/34
[52] U.S. Cl. ........................... 99/449; 108/64; 126/25 R; 126/30; 126/37 B; 126/50; 211/175; 211/182; 248/129; 248/172; 280/652
[58] Field of Search ............... 99/449, 357; 211/189, 211/175, 182; 280/638, 652; 126/25 R, 30, 37 B, 50, 38; 248/129, 172; 108/143, 64, 65

[56] References Cited

U.S. PATENT DOCUMENTS

| | | | |
|---|---|---|---|
| 282,235 | 7/1883 | Stern | 126/25 R |
| 394,439 | 12/1888 | Beckert | 248/129 |
| 892,083 | 6/1908 | Rawlinson | 248/129 |
| 1,315,656 | 9/1919 | Burgener | 211/182 |
| 1,496,344 | 6/1924 | Levinson | 126/38 |
| 2,338,092 | 1/1944 | Brown | 248/172 |
| 2,909,298 | 10/1959 | Baudhuin | 280/638 |
| 3,955,511 | 5/1976 | Bak | 248/172 |
| 4,686,958 | 8/1987 | Skelton et al. | 126/25 R |
| 4,718,399 | 1/1988 | Shepherd | 126/25 R |
| 4,759,276 | 7/1988 | Segroves | 126/25 R |

Primary Examiner—Philip R. Coe
Assistant Examiner—Mark Spisich
Attorney, Agent, or Firm—Robert S. Beiser

[57] ABSTRACT

A portable barbeque grill cart is disclosed having a base portion, two opposing end portions, and optional shelf portions. The two end portions are fabricated having two or more slip sleeve connectors adapted for telescopic interconnection of the base portion of the two end portions, thereby making assembly of the cart simple and expedient. The portable barbeque grill cart has no small loose pieces which can be lost or misplaced during shipment or assembly.

19 Claims, 1 Drawing Sheet

PORTABLE BARBEQUE GRILL CART

BACKGROUND OF THE INVENTION

This invention relates generally to portable barbeque grill carts, and is particularly concerned with barbeque grill carts fabricated from connectable pieces of bent metal tubing having a base portion and two opposing end portions. A novel slip sleeve structure is used for connecting the pieces together which makes assembly of the cart simple and expedient. The slip sleeves are formed from sections of tubular metal for telescopic interconnection of the base and end portions.

Because of economic and space considerations it has become general practice, especially in the area of consumer products, to ship and sell products consisting of multiple pieces in an unassembled condition. Although this theoretically saves the retailers and consumers money, it also means that the consumer is left with the laborsome chore of putting the product together. Confusing directions along with numerous nuts and bolts makes this a complicated process. Worse still is the case where the consumer is without mechanical aptitude, or sufficient tools to perform the assembly.

Such problems exist in the area of portable barbeque grills and more particularly, portable barbeque grill carts, which typically are supplied to retailers and consumers in an unassembled condition in order to minimize storage requirements during shipping and warehousing, and to reduce labor costs so that savings can be passed along to the consumer. Since assembly is performed by the consumer, and assembly of the barbeque grill cart itself is the most time consuming part of assembling the entire product, it is desirable to provide a structure which can easily be assembled with a minimum of effort. Such is the intention of the barbeque wagon which is the subject of U.S. Pat. No. 4,718,399. However it has fallen short. This cart and others like it known in the art are comprised of dozens of individual pieces which first must be identified, then sorted, then assembled in a very lengthy multi-step process. In addition to this complicated procedure there is the likelihood that some pieces may be lost, especially the numerous nuts, bolts, washers, and pins.

There is therefore a need for a barbeque grill cart which is ruggedly constructed that comprises few parts and which can be assembled quickly and easily with a minimum of effort.

SUMMARY OF THE INVENTION

Accordingly it is an object of the present invention to provide a portable barbeque grill cart having few parts and which can be assembled quickly and easily with a minimum of effort.

It is a further object of the present invention to provide a portable barbeque grill cart which is stable and ruggedly constructed so that it can withstand rough handling.

It is a further object of the present invention to provide a portable barbeque grill cart which will accommodate barbeque grills of varying sizes, designs, and types.

It is a further object of the present invention to attain such a desirable portable barbeque grill cart construction in an economical and highly efficient manner.

To this end, the present invention provides for a portable barbeque grill cart which is constructed of bent metal tubing and is comprised of a base portion, two oppositely disposed end portions, and in one embodiment, shelf support portions. Slip sleeves are fixedly attached to the end portions and serve as connections between the end portions and the base portion. The slip sleeves have nuts fixedly attached thereto with screws therein for tightening against the base portion. As such, there are no loose pieces used to make the various interconnections other than the body components of the cart, and therefore, assembly can be accomplished very quickly and easily and without the possibility of losing or misplacing any small parts.

Other objects, features and advantages of the present invention will be readily apparent from the following description of a representative embodiment thereof, taken in conjunction with the accompanying drawings, although variations and modifications may be effected without departing from the spirit and scope of the novel concepts embodied in the disclosure.

DETAILED DESCRIPTION OF THE PREFERRED EMBODIMENT

Figures 1, 2, 3, 4:
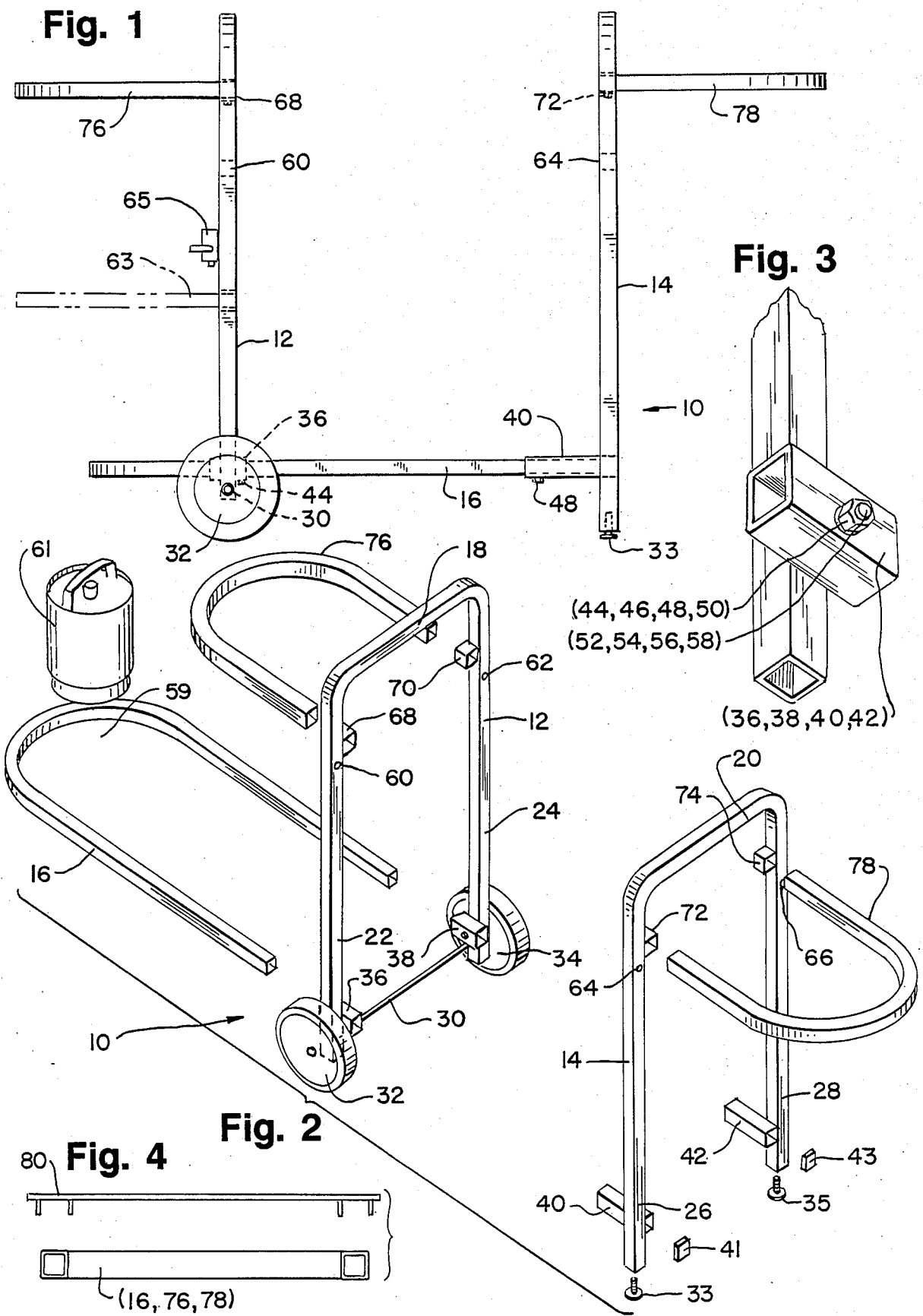
FIG. 1 is a side elevational view showing the assembled portable barbeque grill cart embodying the present invention.
FIG. 2 is an exploded perspective view of the unassembled portable barbeque grill cart embodying the present invention.
FIG. 3 is a fragmentary perspective view illustrating the construction of a slip sleeve embodied in the present invention.
FIG. 4 is a side elevational view illustrating the shelf arrangement which is an alternate embodiment of the present invention.

Reference is made to FIG. 1 and 2 which illustrate a portable barbeque grill cart 10 in an assembled and unassembled condition respectively. The portable barbeque grill cart 10 consists of very few pieces, and is designed to make assembly quick and easy. The portable barbeque grill cart 10 is comprised of first 12 and second 14 end portions, and a base portion 16. In a preferred embodiment the end portions 12 and 14 and base portion 16 are constructed of bent square metal tubing such as aluminum or steel. It is felt that this provides maximum structural stability and ruggedness, although round tubing, bar stock, plastic or similar rigid materials could also be used.

As illustrated in FIG. 2 the end portions 12 and 14 and base portion 16 are formed into U-shapes. The end portions 12 and 14 are arranged in an inverted U position where the rounded portions form the tops 18 and 20 of the end portions 12 and 14 respectively, and the side portions form the legs 22, 24 and 26, 28 of the end portions 12 and 14 respectively. The first end portion 12 has an axle 30 which runs between the legs 22 and 24 and extends through the legs 22 and 24 on each side. Attached to the axle on the outside of each leg 22 and 24 are wheels 32 and 34. The wheels 32 and 34 are designed to be large enough to make the grill and cart easily portable, and have durable rugged rubber outer coverings which provide traction when the barbeque grill cart 10 is in transit and gripping power when the barbeque grill cart 10 is stationary. The axle 30, (which supports the wheels 32 and 34), runs between legs 22 and 24. Axle 30 provides additional structural support to the completed assembly. In an alternate embodiment, the wheels 32 and 34 can be attached to the legs 22 and 24 with a nut and bolt or similarly structured combination.

The second end portion 14 may have adjustable feet 33 and 35, respectively connected to legs 26 and 28 to provide additional stability to the assembled cart 10 and can be adjusted for leveling the cart 10 on different terrains. Feet 33 and 35 may have metal or plastic caps on their ends to improve adhesion to and prevent damage to the surface supporting the cart 10.

Respectively attached to the legs 22 and 24 of the first end portion 12 are slip sleeve connectors 36 and 38 and respectively attached to the legs 26 and 28 of the second end portion 14 are slip sleeve connectors 40 and 42. The slip sleeve connectors 36, 38, and 40, 42 are preferably attached to the respective legs 22, 24 and 26, 28 by welding, and are arranged in a plane above the axle 30. The slip sleeve connectors 36, 38, 40, 42 facilitate the ease in which the portable barbeque grill cart 10 can be assembled. The outer ends of slip sleeve connectors 40 and 42 are fitted with caps 41 and 43 respectively, to provide a finished appearance and to guard against possible sharp edges.

As shown in greater detail in FIG. 3, each slip sleeve connector 36, 38, 40, 42 has at least one threaded nut 44, 46, 48, 50 welded or formed thereon with complimentary threaded screws 52, 54, 56, 58 contained therein. The nuts 44–50 are preferably located on the bottom of slip sleeves 36–42 and 68–74 to assure squareness by holding the tubing against the top of the slip sleeves 36–42 and 68–74. In an alternative embodiment, flat tapped metal may be used rather than nuts, or the slip sleeves may be constructed of sufficiently heavy gauge material to be tapped for accommodating threaded screws. The screws can be Allen head type or any other conventional type screw. The U-shaped base portion 16 is slipped through the slip sleeves 36, 38, 40, 42 in a telescoping fashion and then the screws 52, 54, 56, 58 are tightened against the base portion 16, thereby securing the base portion 16 to the end portions 12 and 14. An appropriate tool to accomplish the tightening may be included with the portable barbeque grill cart 10 assembly. The slip sleeves 40 and 42 are constructed of longer sections of material than slip sleeves 36 and 38 for additional lateral support strength at this critical connection. In a preferred embodiment, slip sleeves 40 and 42 are 12 inches in length. It is at these points where the majority of the weight load of a barbeque grill would be distributed.

The portable grill cart 10 also provides utility for a variety of sized and shaped barbeque grills. This is achieved by adjusting the distance between end portion 12 and end portion 14 along the length of base portion 16. The distance is adjusted by slipping the base portion 16 through slip sleeves 40 and 42 to a greater or lesser depth. Slip sleeves 36–42 may be sized so that the distance between end portion 12 and 14 is a minimum of 16 inches and a maximum of 30 inches in the preferred embodiment. Additionally, the rounded end 59 of the base portion 16 is constructed for comfortably accommodating a pressurized container 61 for use as a fuel source, and may also be adjusted to accommodate pressurized containers 61 of varying diameters. The pressurized container 61 will be situated such that the bottom of said container 61 will be cradled in the rounded end of the base portion 16 and will further come in contact with end portion 12 for vertical support. A strap or belt 63 may also be used to further secure the pressurized container 61 to the portable barbeque grill cart 10. In an alternate embodiment, a gas line connector 65, can be attached to the cart 10 for connecting the grill to a gas line. Holes 60, 62, 64, 66 are also provided through each end portion leg 22, 24, 26, 28 respectively through which a connection can be made between the end portions 12 and 14 and various sized and shaped barbeque grills. Holes 60–66 may alternatively be disposed in a horizontal configuration, proximate to the tops 18 and 20 of end portions 12 and 14 respectively. As can be seen, the overall configuration provides for a symmetrical design in which the barbeque grill may be attached facing toward either direction of the barbeque grill cart 10 such that the wheels and the pressurized container 61 can be either on the left, or the right.

At the upper portion of each leg 22, 24, 26, 28 is sleeve connector means 68, 70, 72, 74 respectively, to accommodate shelf support portions 76 and 78, which said shelf support portions 76 and 78 also act as handle means. The connection between the shelf support portions 76 and 78 and the slip sleeves 68, 70, 72, 74 may be identical to that between the base portion 16 and end portions 12 and 14. FIG. 4 illustrates how a shelf 80 can be constructed to fit onto the shelf support portions 76 and 78 and easily be placed thereon and removed therefrom. Base portion 16 may also act as a shelf support portion in the manner described above.

It will be understood that variations and modifications may be effected without departing from the spirit and scope of the novel concepts of this invention.

What is claimed is:

1. A cart comprising:
 a unitary base portion and a pair of oppositely disposed end portions;
 connecting means for connecting said unitary base portion to said end portions, wherein said connecting means comprises a plurality of slip sleeves fixedly attached to each of said end portions and wherein said plurality of slip sleeves are constructed and arranged for telescopic interconnection of said unitary base portion to said end portions; and
 at least one nut fixedly attached to each of said slip sleeves, said nuts having bolt members extending through said slip sleeves for tightening against said unitary base portion thereby securing said unitary base portion to said end portions.

2. A portable cart for accommodating barbeque grills of various sizes, designs, and types, said cart comprising:
 a U-shaped base portion and at least one U-shaped shelf support portion;
 said first U-shaped end portion having an axle disposed across its bottom portion to which wheels are attached adapted or rotation for making said cart portable;
 said first and second U-shaped end portions further having connecting means for attachment of said base portion and said shelf support portions, said connecting means comprising slip sleeves fixedly attached to said first and second U-shaped end portions for telescopic reception of said base portion and said shelf support portions therein; and
 each of said slip sleeves further having a screw mounted therein for tightening against said base portion and said shelf support portions respectively, thereby securing said base portion and said shelf support portions to said first and second end portions, and facilitating swift and easy assembly of said cart; and connecting means for connecting said barbeque grill between said first and second end portions, proximate to the top of said cart.

3. A portable cart as described in claim 2 wherein shelves are retained in said cart without fasteners where said shelves are removable from said shelf support portions by simply lifting for easy cleaning, storing and the like.

4. A cart as in claim 2 wherein said connecting means further comprises a nut fixedly attached to said slip sleeve, said screw being threadedly mounted through said nut.

5. A portable cart for barbeque grills of various sizes, designs and types, said cart comprising:

a U-shaped base portion;

first and second U-shaped end portions which are attachable at variable distances along said base portion according to the barbeque grill to be accommodated;

an axle attached to said first end portion;

wheels attached to said axle adapted for rotation for making said cart portable;

said first and second U-shaped end portions having connecting means for connecting said end portions to said base portion, said connecting means comprising slip sleeves fixedly attached to said first and second U-shaped end portions for telescopic reception of said base portion therein; and each of said slip sleeves having at least one threaded nut fixedly attached thereto and a screw rotatably mounted in said threaded nut for tightening against said base portion, thereby securing said base portion to said first and second end portions, so as to provide for swift and easy assembly of said portable cart and grill; and connecting means for connecting said barbeque grill between said first and second end portions, proximate to the top of said cart; and said U-shaped base portion having a support portion for accommodating a pressurized container for use as a fuel source for heating the barbeque.

6. The portable cart as described in claim 5 and further comprising removable strap means for selectively connecting said pressurized container on said U-shaped end portions.

7. A portable cart for barbeque grills of various sizes, designs and types, said cart comprising:

a U-shaped base portion;

first and second U-shaped end portions which are attachable at variable distances along said base portion according to the barbeque grill to be accommodated;

an axle attached to said first end portion;

wheels attached to said axle adapted for rotation for making said cart portable;

said first and second U-shaped end portions having connecting means for connecting said end portions to said base portion, said connecting means comprising a plurality of slip sleeves fixedly attached to said first and second U-shaped end portions for telescopic reception of said base portion therein;

each of said slip sleeves having at least one threaded nut fixedly attached thereto and a screw rotatably mounted in said threaded nut for tightening against said base portion, thereby securing said base portion to said first and second end portions, so as to provide for swift and easy assembly of said portable cart; and connecting means for connecting said barbeque grill between said first and second end portions, proximate to the top of said cart.

8. A portable cart as described in claim 7 wherein said cart is constructed of bent metal tubing.

9. A portable cart as described in claim 7 wherein said second end portion further includes adjustable feet for leveling of said cart.

10. A portable cart as described in claim 7 wherein said slip sleeves are fixedly attached to said second end portion and have a length equal to at least ⅓rd the distance between said end portions, thereby facilitating the stability of said cart.

11. A portable cart as described in claim 7 wherein a shelf member is provided which is removable from said base portion by lifting so as to facilitate cleaning, storing and the like.

12. A portable cart as described in claim 7 wherein said screw within said nut is an Allen head type screw.

13. A portable cart as described in claim 7 wherein said screw within said nut comprises a slot adapted for accommodating a screwdriver head.

14. A portable cart as described in claim 7 wherein said screw in said nut is selected from the group consisting of a hex head set screw, a square head set screw, an Allen head set screw, and a conventional slotted screw.

15. A portable cart as described in claim 7 wherein said cart includes gas line connector means for connecting said grill to a gas line.

16. A portable cart as described in claim 7 wherein said grill is adapted for reception of charcoal briquettes.

17. A cart as in claim 7, wherein flat tapped metal is fixedly attached to said slip sleeves to accommodate said screws and said nuts are eliminated.

18. A cart as in claim 7 wherein said slip sleeves are constructed of a heavy gauge wall thickness wherein said walls are tapped to accommodate said screws and said nut is eliminated.

19. A cart as in claim 7 wherein said wheels are attached to said legs with a nut and bolt combination thereby eliminating said axle.

* * * * *